Sept. 24, 1968 W. C. WELZ 3,403,327
METHODS AND APPARATUS FOR PROCESSING WELL LOGGING
MEASUREMENTS USING TIME DOMAIN COMPUTATION
TO OBTAIN THE RECIPROCAL FUNCTION
OF THE MEASUREMENTS
Filed Sept. 8, 1965 3 Sheets-Sheet 1
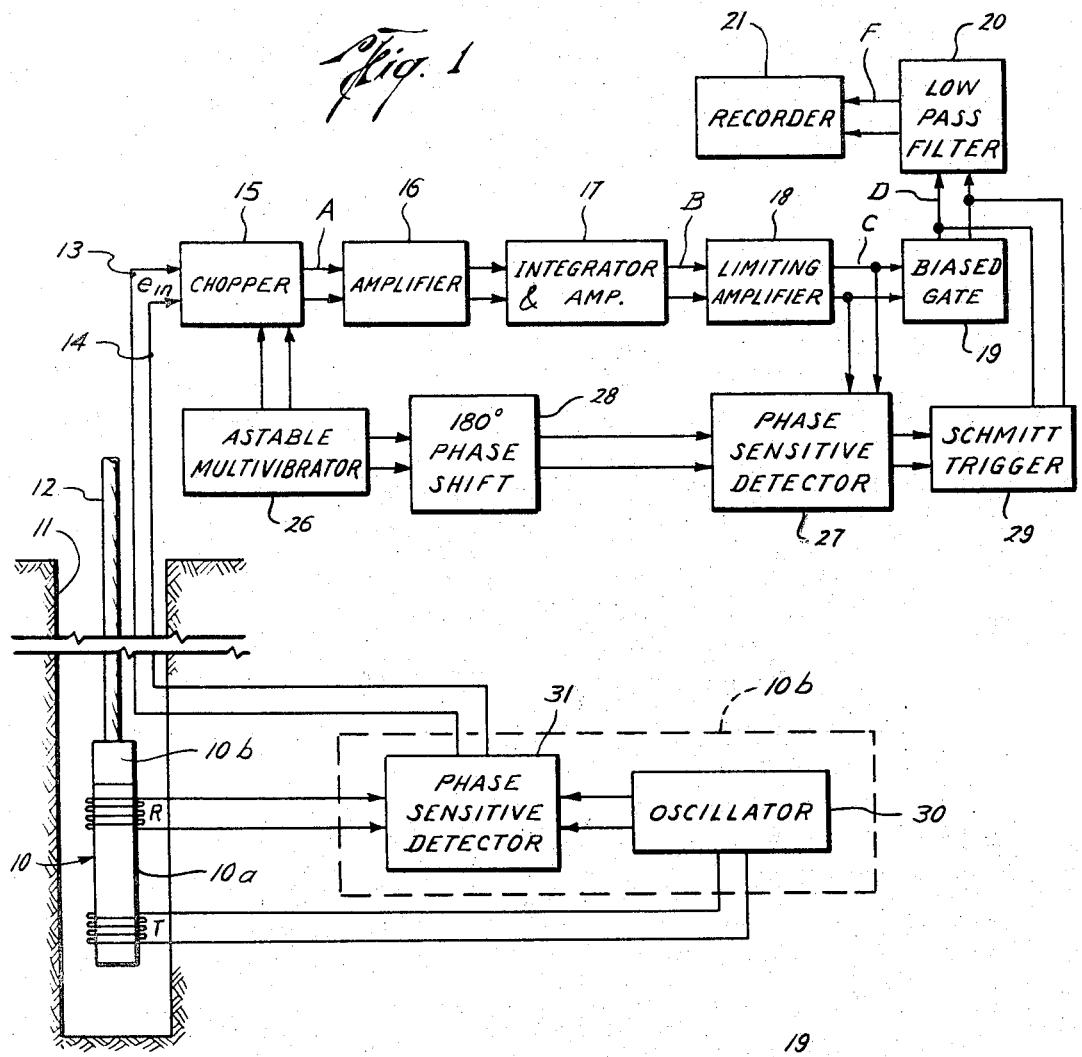
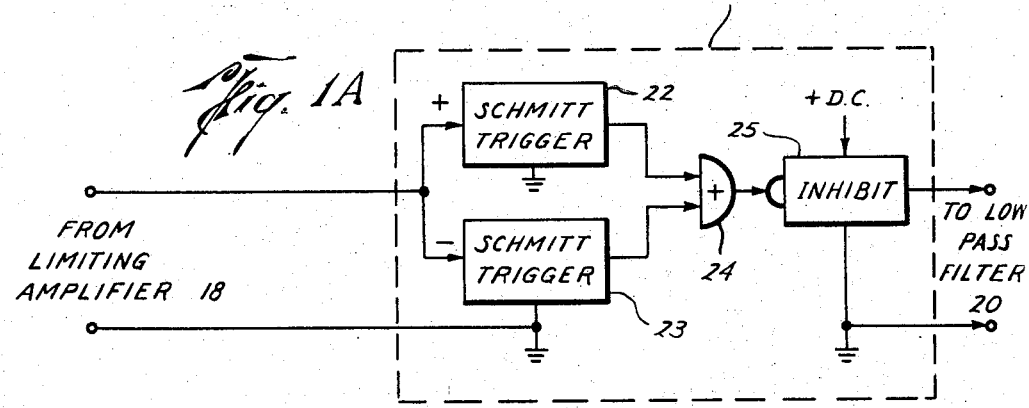

United States Patent Office 3,403,327
Patented Sept. 24, 1968

3,403,327
METHODS AND APPARATUS FOR PROCESSING WELL LOGGING MEASUREMENTS USING TIME DOMAIN COMPUTATION TO OBTAIN THE RECIPROCAL FUNCTION OF THE MEASUREMENTS
Wilbur C. Welz, Houston, Tex., assignor to Schlumberger Technology Corporation, Houston, Tex., a corporation of Texas
Filed Sept. 8, 1965, Ser. No. 485,818
13 Claims. (Cl. 324—1)

ABSTRACT OF THE DISCLOSURE

In accordance with an illustrative embodiment of the invention, a technique for obtaining the reciprocal function of well logging measurements is disclosed. To accomplish this, the well logging measurement signals are chopped to provide substantially square wave signals. These square wave signals are then integrated to produce a triangular shaped signal, which is then limited in amplitude. A signal having a time characteristic representative of the reciprocal of the well logging measurements is generated in response to the limited triangular shaped signal. The time characteristic signal is then converted to a DC type signal representative of the reciprocal for subsequent recordation.

---

This invention relates to the logging of a borehole where measurements of certain characteristics of the surrounding earth formations are taken throughout the length of the borehole to provide indications of oil or gas bearing strata. These logging measurements may have very large amplitude variations due to wide variations in the composition of the surrounding earth formations.

One method of investigating earth formations is to obtain a log of the formation resistivity of the surrounding earth formations. However, some investigating methods provide logs of the formation conductivity of the surrounding earth formations. In order to produce a log of formation resistivity when conductivity logs are obtained, it is necessary to take the reciprocal of the conductivity measurements since resistivity is equal to the reciprocal of conductivity. Since the resistivity or conductivity can vary over a wide range, a device for taking the reciprocal of the conductivity signals must have a large dynamic range, i.e., be able to provide an accurate indication of formation resistivity over a wide range of values. This wide variation in resistivity or conductivity values can take place substantially instantaneously, for example, as the investigating apparatus within the borehole crosses the junction between different earth strata made of greatly different compositions. Thus, the reciprocal taking device must be able to change instantaneously with the measurement values.

Some forms of devices for taking the reciprocal have included computing servo mechanisms where problems of damping and sensitivity restrict the response speed, resolution, and stability, thus causing errors in the instantaneous measurement values. Other reciprocal taking devices have included complex multiple frequency circuits employing feedback circuits where problems of feedback error and accuracy of the various frequencies may cause inaccurateness in the reciprocal values. To obtain a larger dynamic range, the open loop gain of such feedback systems must be high, but such high gain causes stability problems. It would thus be desirable to provide a system for taking the reciprocal of a widely varying DC signal and having a large dynamic range, a fast response speed, stability, and a relative simple design.

Sometimes, when investigating earth formations, by obtaining resistivity or conductivity indications, an inadvertent negative reading will be obtained. Since a negative resistivity reading is obviously in error, it would be desirable to indicate the fact that such a negative reading has been obtained to avoid it being recorded as a positive reading.

It is an object of the invention therefore to provide new and improved methods and apparatus for taking the reciprocal of well logging measurements.

It is another object of the invention to provide new and improved methods and apparatus for taking the reciprocal of well logging measurements and providing an indication when resistivity measurements are negative.

It is another object of the invention to provide new and improved methods and apparatus for taking the reciprocal of a widely varying input signal wherein the response speed, resolution and stability are improved over prior art arrangements.

It is still another object of the present invention to provide new and improved methods and apparatus for taking the reciprocal of a widely varying DC signal wherein a reciprocal taking device of relative simple design has a large dynamic range.

In accordance with the present invention, methods and apparatus for processing measurements of a characteristic of earth formations traversed by a borehole comprises providing well logging measurements representative of the characteristic of the earth formations and converting the well logging measurements to a substantially square wave signal, the amplitude of the square wave signal being representative of the well logging measurements. The invention further comprises producing a first output signal having a time characteristic which is representative of a given function of the amplitude of the square wave signal in response to the square wave signal and producing a second output signal in response to the first output signal, the amplitude of the second output signal being representative of the given function of the well logging measurements. In the preferred form, this given function is a reciprocal function.

For a better understanding of the present invention, together with other and further objects thereof, reference is had to the following description taken in connection with the accompanying drawings, the scope of the invention being pointed out in the appended claims.

Referring to the drawings:

FIG. 1 illustrates a tool for making well logging measurements within a borehole together with a schematic diagram of the apparatus for converting the well logging measurements to a signal representative of the reciprocal of the well logging measurements.

Figure 2A:
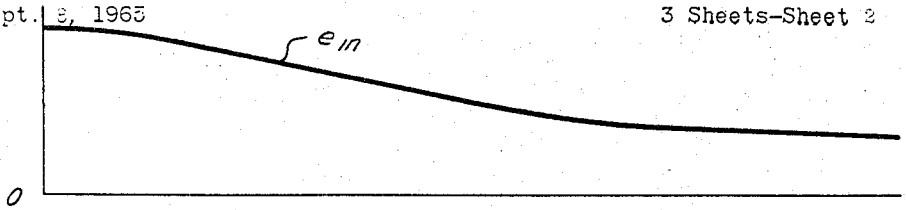
FIG. 2 illustrates the wave shapes of signals at different points in the FIG. 1 apparatus.
Figure 2B:
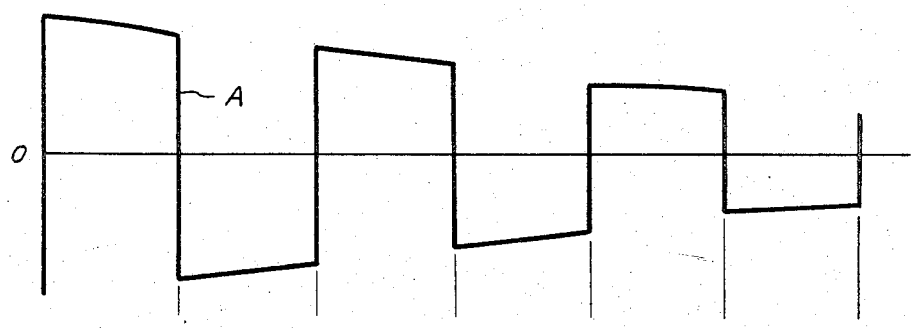

Referring now to FIG. 1, there is shown a tool 10 within a borehole 11 adapted for investigating the earth formations surrounding the borehole 11. A cable 12 supports the tool 10 within the borehole 11 and is raised and lowered in and out of the borehole by a suitable cable reeling device (not shown) at the surface of the earth. A transmitter coil T and a receiver coil R are wound around a support member 10a which is made of a non-conductive, non-magnetic material. Each coil is thus of the cylindrical solenoid type with the longitudinal axis of the coils T and R in line with one another and generally in line with the longitudinal axis of the borehole 11.

A power supply (not shown) at the surface of the earth supplies power to the downhole circuits, which are located inside of the dotted line box 10b, which corresponds to the portion 10b of tool 10. An oscillator 30 supplies an alternating current to the transmitter coil T. This alternating current in the transmitter coil T creates an electromagnetic flux field surrounding the transmitter coil T. This alternating flux field signal creates a secondary current flow, commonly referred to as "eddy current," in the earth formations adjacent to the transmitter coil T. This flow of secondary current in the earth formations induces a voltage component in the receiver coil R. The magnitude of this voltage component is generally proportional to the magnitude of the secondary current flow which, in turn, is proportional to the conductivity value of the earth formation material.

This voltage component received by the receiver coil R is supplied to a phase-sensitive detector 31, to which also is supplied a phase-reference signal from oscillator 30. Phase-sensitive detector 31 provides direct current output voltage which is proportional to that portion of the voltage from receiver coil R which is in-phase with the phase-reference signal from oscillator 30. This in-phase portion of the voltage received by receiver coil R is proportional to the conductivity of the earth formations adjacent to tool 10 and thus comprises the well logging measurement. The direct current output voltage from phase-sensitive detector 31 is supplied to the surface of the earth via conductors 13 and 14. Conductors 13 and 14 pass through armored multi-conductor cable 12, but are shown outside of cable 12 for purposes of clarity of the electrical schematic.

The induction logging apparatus of FIG. 1 is merely an example of apparatus for investigating earth formations which could be utilized with the present invention. Any other type of earth formation investigating apparatus could be utilized, as for example, the induction logging system shown in U.S. Patent 3,147,429, granted to J. H. Moran on Sept. 1, 1964, or the electrode system shown in U.S. Patent 3,031,612, granted to M. F. Easterling on Apr. 24, 1962, etc.

Conductors 13 and 14 at the surface of the earth are connected to the input of a chopper 15 of conventional design which transforms the signals on conductors 13 and 14 to square wave signals of any desired frequency, normally several times the maximum frequency of variation of the well logging measurements on conductors 13 and 14. The square wave drive for chopping the well logging measurements is supplied to chopper 15 from an astable multivibrator 26. The chopped square wave well logging measurements from chopper 15 are supplied to an amplifier 16 having the ability to handle the maximum voltage output possible from chopper 15 without any serious distortion. The square wave output signal from amplifier 16 is integrated and then amplified by an integrator and amplifier 17. This integration converts the applied square wave signal from amplifier 16 to a triangular wave signal having a peak amplitude proportional to the amplitude of the square wave signal from amplifier 16. The triangular wave output signal from integrator and amplifier 17 is supplied to a limiting amplifier 18 which after amplification, limits both the positive and negative portions of the triangular wave signal to fixed positive and negative amplitudes without affecting the slope of the triangular wave. The limited triangular wave signal from limiting amplifier 18 is applied to a biased gate 19 which provides a constant current output during that time when the triangular wave signal from limiting amplifier 18 is between specified amplitude levels. The constant current output pulses from biased gate 19 are smoothed by a suitable low pass filter 20 which provides a substantially DC signal to a recorder 21. Recorder 21 records this DC signal in depth synchronism with the depth of the tool 10 within the borehole by suitable depth indicating means (not shown). Since the frequency of chopper 15 is constant, the amplitude of the output signal from low pass filter 20 will be proportional to the pulse width of the constant current output pulses from biased gate 19.

To obtain a better understanding of the operation of the FIG. 1 apparatus, refer to FIG. 2(a-e) which shows the wave shapes at different points in the FIG. 1 apparatus. Looking at FIG. 2(a), the well logging measurements $e_{in}$ on conductors 13 and 14 of FIG. 1 are shown with respect to 0 level for clarity. (In actuality, conductors 13 and 14 are floating and the 0 level is not introduced until the output of chopper 15.) In FIG. 2(b), the solid line square wave signal A represents the chopped well logging measurement output from chopper 15 of FIG. 1, which is symmetrical with respect to zero volts. The triangular wave B of FIG. 2(c) represents the triangular wave output from integrator and amplifier 17 of FIG. 1, which is also symmetrical with respect to zero volts. It can be seen from FIGS. 2(a-c) that the voltage of the triangular wave shape B of FIG. 2(c) increases in a substantial linear manner during the half-cycle when the square wave A is positive and then decreases in a substantially linear manner during the half-cycle when the square wave A is negative. As the amplitude of the well logging measurements $e_{in}$ decrease, or increases, the amplitude of the square wave signal A of FIG. 2(b) will change proportionally. The peak amplitude of the triangular wave shape B of FIG. 2(c) is directly proportional to the amplitude of the square wave signal A of FIG. 2(b). From FIGS. 2(a-c), it can be seen that as the amplitude of $e_{in}$ and thus the amplitude of the square wave A changes, the slope of the triangular wave shape B will change, that is, the time required for the triangular wave shape B to pass between two fixed points of amplitude will vary.

Figure 2C:
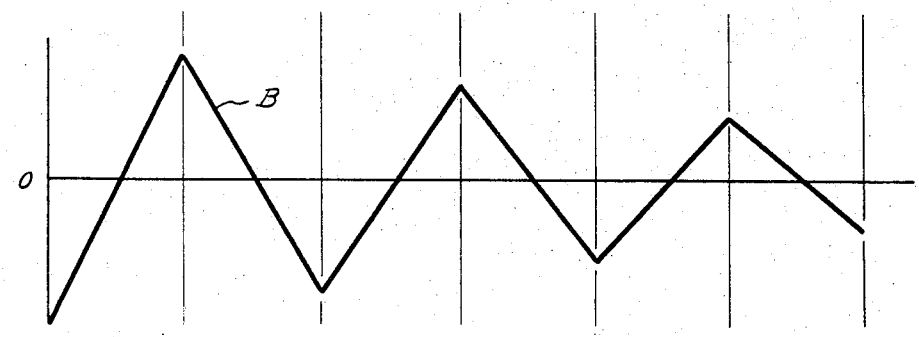
Figure 2D:
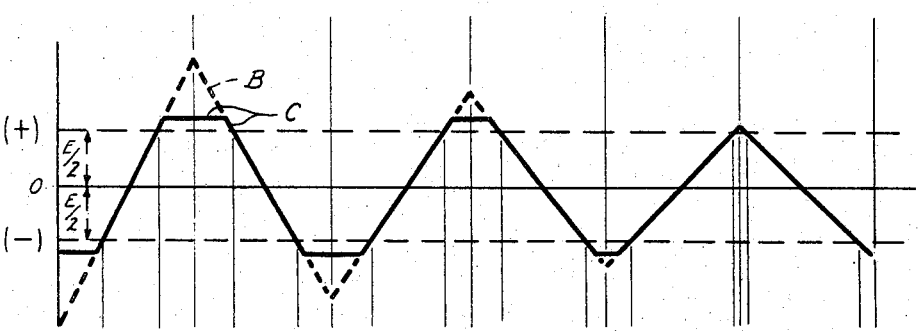

Looking now at FIG. 2(d), there is shown the output of the limiting amplifier 18 of FIG. 1. The dotted line wave shape B is the same as the wave shape B of FIG. 2(c). The solid line wave shape C of FIG. 2(d) represents the limited triangular wave signal output from limiting amplifier 18 of FIG. 1. It is seen from FIG. 2(d) that the triangular wave shape C is limited substantially symmetrically with respect to zero volts. The dotted lines in FIG. 2(d) designated (+) and (−) represent the postive and negative trigger voltages of biased gate 19. When the voltage of the limited triangular wave shape C is between the trigger voltages (−) and (+), biased gate 19 will provide a pulse of constant current to low pass filter 20. This pulse of constant current from biased gate 19 is shown in FIG. 2(e).

Figure 2E:
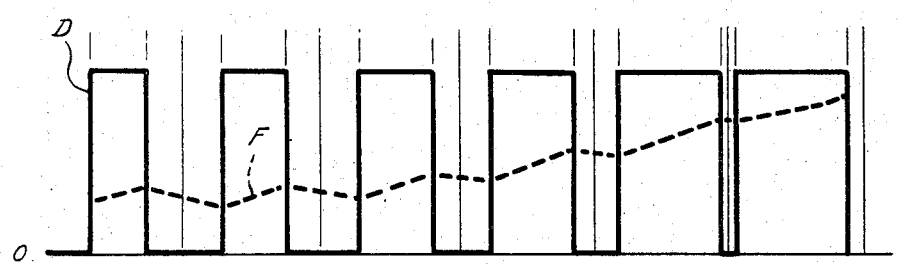

From FIG. 2(e), it can be seen that the constant current output pulses D from biased gate 19 have a pulse width equal to the time that it takes the limited triangular wave shape C to pass between the (−) and (+) trigger points of biased gate 19. The pulse widths of the pulses D from biased gate 19 are representative of the reciprocal of the well logging measurements $e_{in}$. The dotted line F of FIG. 2(e) represents the substantially DC output current from low pass filter 20. It can be seen from FIG. 2(e) that the pulse width of the constant current pulses D from biased gate 19 increases as the slope of the triangular wave shape decreases, which in turn decreases as the amplitude of the well logging measurements $e_{in}$ decreases. Thus the pulse width of the constant current pulses D increase as the amplitude of $e_{in}$ decreases. Since the substantially DC output current F from low pass filter 20 increases as the pulse width of wave shape D increases, the substantially DC output current F from low pass filter 20 will represent an inverse function of the well logging measurements $e_{in}$.

Looking now at FIG. 1(a) there is shown an example of a typical construction of biased gate 19. The limited triangular input signal from limiting amplifier 18 is supplied to a Schmitt trigger 22 and a Schmitt trigger 23. Schmitt trigger 22 is biased to provide a positive output signal when the amplitude of the limited triangular wave from limiting amplifier 18 is above the designated threshold voltage, shown as (+) in FIG. 2(d). On the other hand, the Schmitt trigger 23 provides a positive output signal when the amplitude of the limited triangular wave from limiting amplifier 18 is below the designated threshold voltage shown as (—) in FIG. 2(d). Thus, one of Schmitt triggers 22 or 23 will be turned on during that time when the amplitude of the limited triangular wave C of FIG. 2(d) is either above the threshold level (+) or below the threshold level (—). The positive output signals form Schmitt triggers 22 and 23 are supplied to an OR gate 24, whose output is supplied to the control terminal of an inhibit gate 25. A constant current source, designated +DC, is also supplied to inhibit gate 25.

Inhibit gate 25 will supply a constant current output to low pass filter 20 until a signal is received from OR gate 24, at which time inhibit gate 25 will have a zero output. The output from inhibit gate 25, which is the output from biased gate 19, is supplied to the low pass filter 20. Thus, it can be seen that inhibit gate 25 will supply a constant current output during that interval of time when the limited triangular wave shape C of FIG. 2(c) is between the (—) and (+) threshold values of Schmitt triggers 22 and 23.

When investigating earth formations by measuring the resistivity of conductivity of the earth formations surrounding the borehole, negative resistivity of conductivity indications are sometimes inadvertently encountered, of course, such negative resistivity or conductivity indications are erroneous. The output pulses from biased gate 19 of FIG. 1 are positive regardless of the polarity of the well logging measurements $e_{in}$. Thus, the output current (F in FIG. 2(e)) from low pass filter 20 to recorder 21 will indicate positive polarity regardless of the true polarity of the well logging measurements $e_{in}$.

To solve this problem, a phase-sensitive detector is utilized to determine polarity. Looking at FIG. 1, the output signal from limiting amplifier 18 is also supplied to a phase-sensitive detector 27. The astable multivibrator also supplies a square wave signal, which is in-phase with the signal supplied to chopper 15, to a 180° phase shift circuit 28. Phase shift circuit 28 supplies a phase-reference signal to phase-sensitive detector 27, whose input circuit converts the phase-reference signal to a triangular wave for detection of that portion of the limited triangular wave from limiting amplifier 18 which is in-phase with the applied phase-reference signal.

Phase-sensitive detector 27 supplies a DC output signal proportional to that portion of the signal from limiting amplifier 18 (C in FIG. 2(d)) which is in-phase with the phase-reference signal. Thus, phase-sensitive detector 27 will provide an output signal only if the polarity of the well logging measurements $e_{in}$ is negative. This detected output signal from phase-sensitive detector 27 is supplied to Schmitt trigger 29, which applies a positive constant current signal to low pass filter 20 during the time that the well logging measurements $e_{in}$ are negative. The magnitude of this current from Schmitt trigger 29 is sufficient to drive the galvanometer unit within recorder 21 beyond full scale deflection, which indicates negative resistivity. It is to be understood that this negative resistivity indication signal could be used in other ways than as shown, e.g., stop recorder 21, provide a separate signal to recorder 21, etc.

Figure 3:
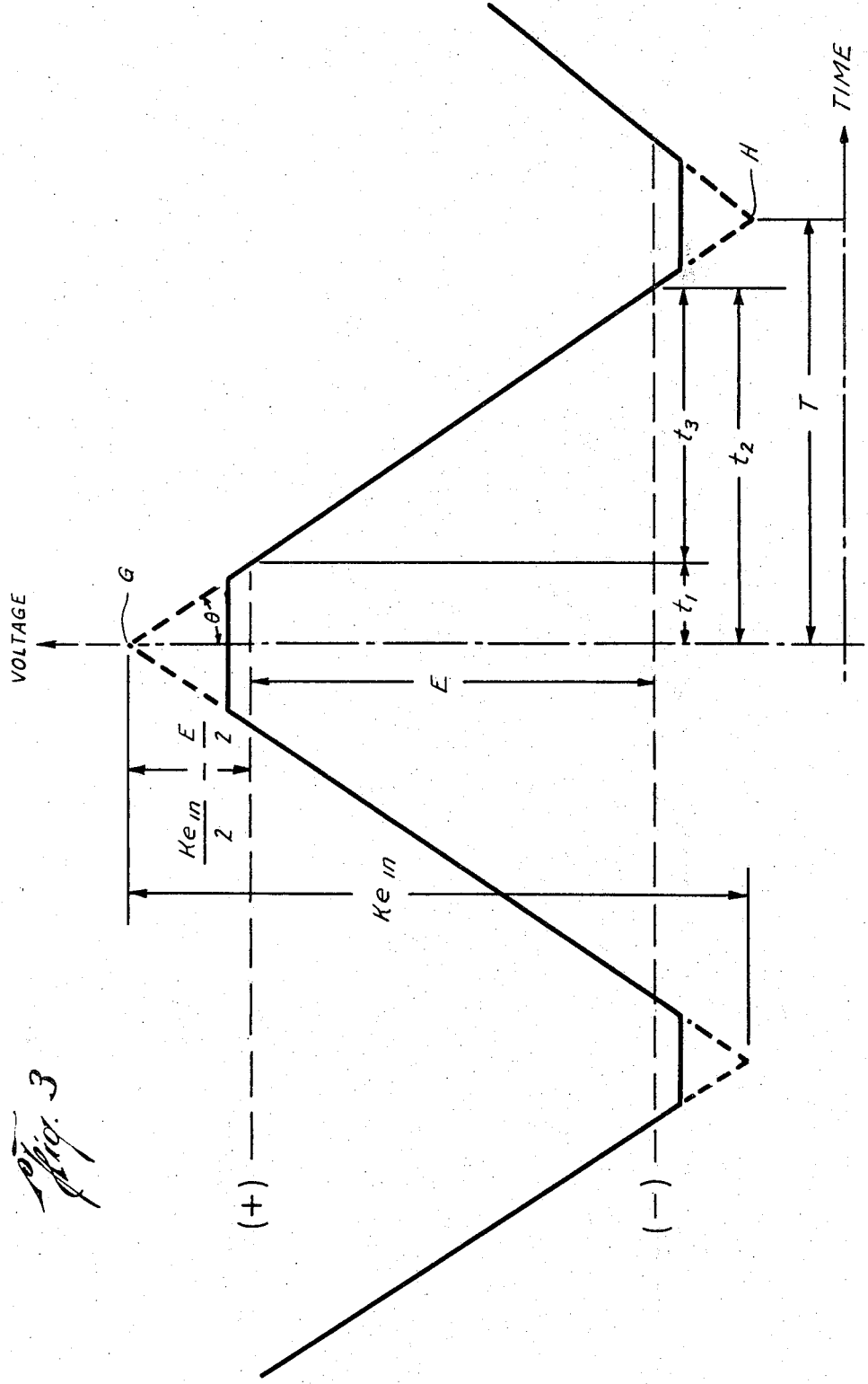
FIG. 3 illustrates one of the wave shapes of FIG. 2 for purposes of explanation of the mathematical derivation of the principle of operation of the present invention.

Looking now at FIG. 3, there is shown the wave shape of FIG. 2(d) for the purpose of deriving the mathematical relationship of the present invention. The peak amplitude of the triangular wave is equal to the sum of the gains of chopper 15, amplifier 16, integrator and amplifier 17 and limiting amplifier 18, which total gain is designated K, times the well logging measurement $e_{in}$, ($Ke_{in}$). The voltage difference between the threshold voltages of biased gate 19, (+) and (—), is designated E. The time interval for the triangular wave to pass between the positive peak G and negative peak H is designated T. (Thus 1/2T is the frequency of chopper 15.) The time interval for the triangular wave to pass between the positive peak G and the positive threshold (+) is designated $t_1$. The time interval for the triangular wave to pass between the positive peak G and the negative threshold (—) is designated $t_2$. The time interval for the triangular wave to pass between the positive and negative thresholds (+) and (—), is designated $t_3$. If now a line is drawn from the point G perpendicular to the time axis of FIG. 3, the angle between that line and the portion of the triangular wave between G and H is designated $\theta$. The relationship for the voltage difference between the positive peak G and the positive threshold (+) can be written as $$\frac{K \cdot e_{in}}{2} - \frac{E}{2}$$

From FIG. 3, we can write the relationship $$\tan \theta = \frac{T}{Ke_{in}} = \frac{t_2}{\frac{Ke_{in}}{2}+\frac{E}{2}} = \frac{t_1}{\frac{Ke_{in}}{2}-\frac{E}{2}} \tag{1}$$

Solving Equation 1 for $t_1$ and $t_2$, we have $$t_1 = \frac{T\left(\frac{Ke_{in}}{2}-\frac{E}{2}\right)}{Ke_{in}} \tag{2}$$

and $$t_2 = \frac{T\left(\frac{Ke_{in}}{2}+\frac{E}{2}\right)}{Ke_{in}} \tag{3}$$

We know that $$t_3 = t_2 - t_1 \tag{4}$$

Combining Equations 2, 3 and 4, we have $$t_3 = \frac{T\left(\frac{Ke_{in}}{2}+\frac{E}{2}\right)}{Ke_{in}} - \frac{T\left(\frac{Ke_{in}}{2}-\frac{E}{2}\right)}{Ke_{in}} \tag{5}$$

Simplifying Equation 5, we arrive at the result $$t_3 = \frac{TE}{Ke_{in}} \tag{6}$$

Since T, E, and K are constants, it is seen from Equation 6 that the time $t_3$ for the triangular wave to pass between the positive and negative thresholds (+) and (—) is inversely proportional to the well logging measurements $e_{in}$.

By way of variation, the system of FIG. 1 can be adapted to provide an output signal proportional to the relationship one minus the reciprocal of the well logging measurement $e_{in}$ by changing the biased gate 19 to provide a constant current output during that interval of time when the triangular wave is outside of the threshold values of biased gate 19 instead of inside. From Equation 1, we can write the relationship $$t_1 = \frac{T\left(\frac{Ke_{in}}{2}-\frac{E}{2}\right)}{Ke_{in}} \tag{7}$$

Simplifying Equation 7, we have $$t_1 = T\left(\frac{1}{2} - \frac{\frac{E}{2}}{Ke_{in}}\right) \tag{8}$$

Multiplying both sides of Equation 8 by 2, we arrive at the result $$2t_1 = T\left(1 - \frac{E}{Ke_{in}}\right) \tag{9}$$

From FIG. 3, it can be seen that $2t_1$ is the time interval in which the triangular wave is outside of the threshold values (+) and (—) of biased gate 19. Since T, E, and K are constants, it is seen from Equation 9 that the time interval $2t_1$ that the triangular wave is outside the threshold values of biased gate 19, is equal to $$\left(1 - \frac{\text{constant}}{e_{\text{in}}}\right)$$

It can now be seen that the apparatus of FIG. 1 will accurately and continuously provide a substantial DC output signal proportional to the reciprocal of a widely varying input signal. This is accomplished without the problems of damping and sensitivity affecting response speed, resolution, and stability found in computing servo mechanisms. This result is also accomplished by a relatively simple electronic system without the complex circuitry required for multiple frequency reciprocators, or the error present in feedback loops.

Thus, by suitable amplification of the integated square wave or triangular wave signal, the dynamic range of the reciprocator can be extended, still maintaining accuracy, since the greater the amplification, the greater the dynamic range. Since the well logging measurement $e_{\text{in}}$ can vary over a wide range, the triangular wave signal after great amplification, may have an amplitude that is too high to handle when $e_{\text{in}}$ is high. Thus, by limiting the triangular wave to a desired level and at the same time maintaining undistorted the slope of the unlimited portion of the triangular wave, the wide dynamic range obtained from amplification is maintained, and a relatively low and easy to handle amplitude is obtained. In addition, negative resistivity indications are detected and this fact indicated on recorder 21 by greater than full scale deflection of the galvanometer unit of recorder 21, thus avoiding possible errors. The apparatus of the present invention thus provides great accuracy over a wide range of input amplitude, which is necessary with well logging measurements, through the use of relatively simple circuitry.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of processing measurements of a characteristic of earth formations traversed by a borehole, comprising:
   (a) providing well logging measurements representative of the characteristic of the earth formations;
   (b) chopping the well logging measurements to a square wave signal, the amplitude of the square wave signal being directly proportional to the well logging measurements;
   (c) producing a first output signal in response to the square wave signal, the first output signal having a time characteristic which is representative of the reciprocal of the amplitude of the square wave signal; and
   (d) producing a second output signal in response to the first output signal, the amplitude of the second output signal being representative of the reciprocal of the well logging measurements.

2. A method of processing measurements of a characteristic of earth formations traversed by a borehole, comprising:
   (a) generating a current in the earth formations surrounding the borehole;
   (b) generating well logging measurements representative of a characteristic of the earth formations in response to the current generated in the surrounding earth formations;
   (c) converting the well logging measurements to a square wave signal, the amplitude of the square wave signal being representative of the well logging measurements;
   (d) producing a first output signal in response to the square wave signal, the first output signal having a time characteristic which is representative of the reciprocal of the amplitude of the square wave signal;
   (e) producing a second output signal in response to the first output signal, the amplitude of the second output signal being representative of the reciprocal of the well logging measurements; and
   (f) generating a signal upon the well logging measurements becoming negative in response to the relative phase of the converted well logging measurements to indicate a negative measurement.

3. A method of processing measurements of a characteristic of earth formations traversed by a borehole, comprising:
   (a) providing well logging measurements representative of the characteristic of the earth formations;
   (b) converting the well logging measurements to a square wave signal, the amplitude of the square wave signal being representative of the well logging measurements;
   (c) integrating the converted well logging measurements to produce a substantially triangular shaped signal;
   (d) generating a pulse type signal having a time characteristic representative of the reciprocal of the well logging measurements in response to the triangular shaped signal; and
   (e) producing a DC output signal in response to the pulse type signal, the amplitude of the DC output signal being representative of the reciprocal of the well logging measurements.

4. A system for processing measurements of a characteristic of earth formations traversed by a borehole, comprising:
   (a) means for providing well logging measurements representative of the characteristic of the earth formations;
   (b) means for chopping the well logging measurements to a substantially square wave signal, the amplitude of the square wave signal being directly proportional to the amplitude of the well logging measurements;
   (c) means responsive to the square wave signal for producing a first output signal having a time characteristic which is representative of the reciprocal of the amplitude of the square wave signal; and
   (d) means responsive to the first output signal to produce a second output signal, the amplitude of the second output signal being representative of the reciprocal of the well logging measurements.

5. A system for processing measurements of a characteristic of earth formations traversed by a borehole, comprising:
   (a) means for providing well logging measurements representative of the characteristic of the earth formations;
   (b) means for chopping the well logging measurements to a substantially square wave signal, the amplitude of the square wave signal being directly proportional to the amplitude of the well logging measurements;
   (c) means for converting the chopped well logging measurements to a first signal whose amplitude varies with time in accordance with a given function;
   (d) means for limiting the amplitude of the first signal to a given amplitude level;
   (e) means for comparing the limited first signal with a reference amplitude to produce a pulse output signal having a time characteristic representative of the given function of the well logging measurements, the limiting means acting to limit the amplitude of the first signal to an amplitude exceeding the reference amplitude by a relatively small margin so that the first signal will not overdrive the pulse producing means; and (f) means responsive to the pulse output signal to produce a second output signal, the amplitude of the second output signal being representative of the given function of the well logging measurements.

6. A system for processing measurements of a characteristic of earth formations traversed by a borehole, comprising:

(a) means for providing well logging measurements representative of the characteristic of the earth formations;

(b) means for converting the well logging measurements to a subtsantially square wave signal, the amplitude of the square wave signal being representative of the well logging measurements;

(c) means responsive to the square wave signal for producing a first output signal having a time characteristic which is representative of the reciprocal of the amplitude of the square wave signal;

(d) means responsive to the first output signal to produce a second output signal, the amplitude of the second output signal being representative of the reciprocal of the well logging measurements; and (e) means responsive to the phase of the converted well logging measurments for providing an indication upon the well logging measurements becoming negative.

7. The system of claim 4 in which the means for converting the well logging measurements to a substantially square wave signal comprises chopper means for chopping the well logging measurements at a given fixed frequency.

8. The system of claim 4 in which the means for producing a first output signal includes:

(1) first means for converting the square wave signal to a substantially triangular wave shape whose peak amplitude is proportional to the amplitude of the square wave signal;

(2) second means responsive to the triangular wave for producing the first output signal, the second means responsive to two given amplitudes of the triangular wave for providing the time characteristic representative of the reciprocal of the amplitude of the square wave signal.

9. The system of claim 8 in which the means for producing a first output signal further includes limiting means for limiting the amplitude of the triangular wave output from the first means, the second means being responsive to the limited triangular wave.

10. The system of claim 9 and further including means responsive to the limited triangular wave for providing an output indication when the polarity of the well logging measurements is negative.

11. A system for processing measurements of a characteristic of earth formations traversed by a borehole, comprising:

(a) means for providing well logging measurements representative of the characteristic of the earth formations;

(b) means for converting the well logging measurements to a substantially square wave signal, the amplitude of the square wave signal being representative of the well logging measurements;

(c) means for integrating the square wave signal to produce a substantially triangular wave shape signal;

(d) means responsive to the amplitude rate of change of the triangular wave shape signal for producing a pulse type signal having a time characteristic which is representative of the reciprocal of the well logging measurements; and (e) means responsive to the pulse type signal to produce a substantially DC output signal, the amplitude of which is representative of the reciprocal of the well logging measurements.

12. The system of claim 9 in which the means responsive to the first output signal to produce a second output signal comprises a low pass filter for smoothing the first output signal to a substantially DC signal which varies in proportion to the reciprocal of the well logging measurements.

13. The system of claim 12 in which the means for converting the well logging measurements to a substantially square wave signal comprises chopper means for chopping the well logging measurements at a given fixed frequency.

References Cited

UNITED STATES PATENTS

| | | | |
|---|---|---|---|
| 2,600,423 | 6/1952 | Nolle | 328—145 XR |
| 3,020,471 | 2/1962 | Barringer | 324—6 |
| 3,078,416 | 2/1963 | McAuliffe | 328—22 XR |
| 3,092,719 | 6/1963 | Bravenec | 324—1 XR |
| 3,235,793 | 2/1966 | Reese | 324—1 |
| 3,237,113 | 2/1966 | Klein | 328—150 XR |

RUDOLPH V. ROLINEC, *Primary Examiner.*

GERARD R. STRECKER, *Assistant Examiner.*